(No Model.) 5 Sheets—Sheet 1.
C. WILLMOTT.
TOOL OR APPARATUS FOR ORNAMENTING METALLIC TUBES.
No. 465,957. Patented Dec. 29, 1891.
Fig. 9
Fig. 1
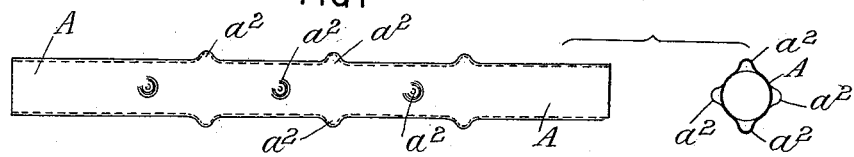
Fig. 12      Fig. 14
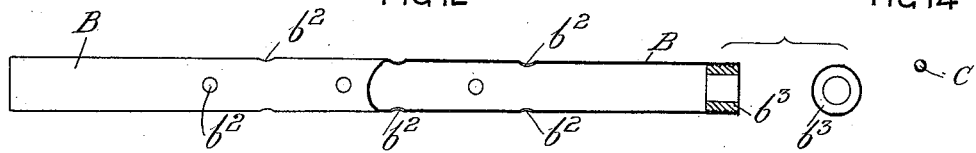 
Fig. 13
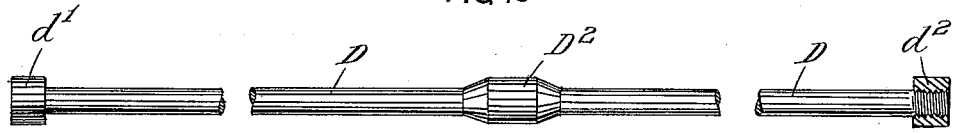
Fig. 11
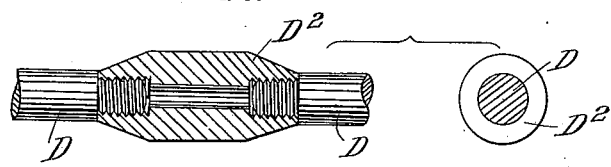
Fig. 10
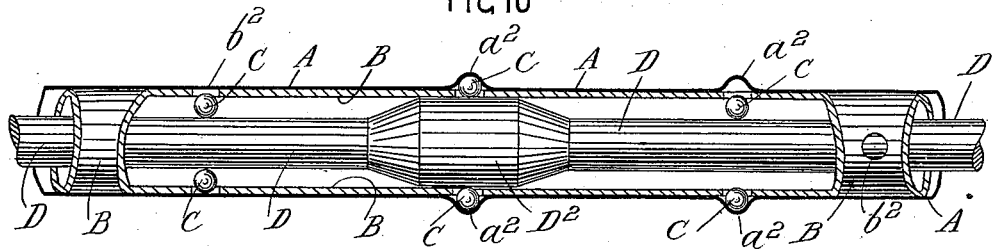
WITNESSES
Herbert Whitehouse.
George Herbert Bloye.
INVENTOR
Charles Willmott (No Model.) 5 Sheets—Sheet 2.
C. WILLMOTT.
TOOL OR APPARATUS FOR ORNAMENTING METALLIC TUBES.
No. 465,957. Patented Dec. 29, 1891.
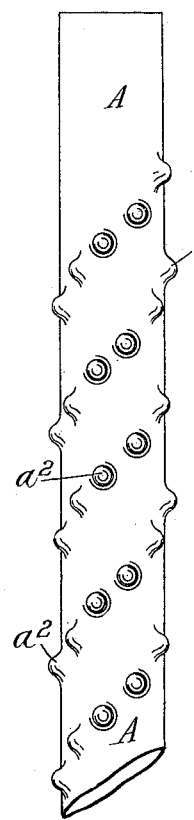
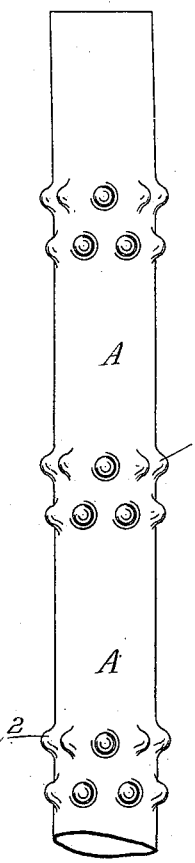
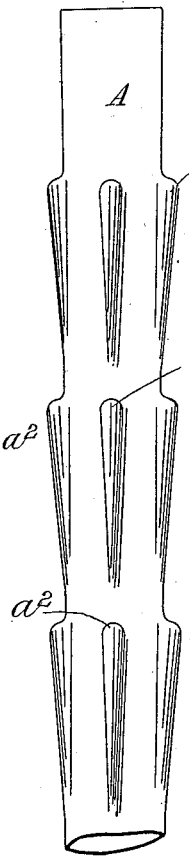
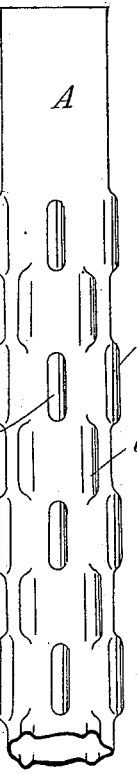
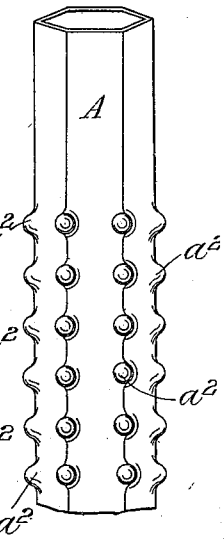
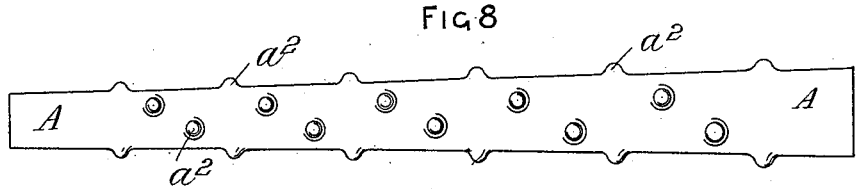
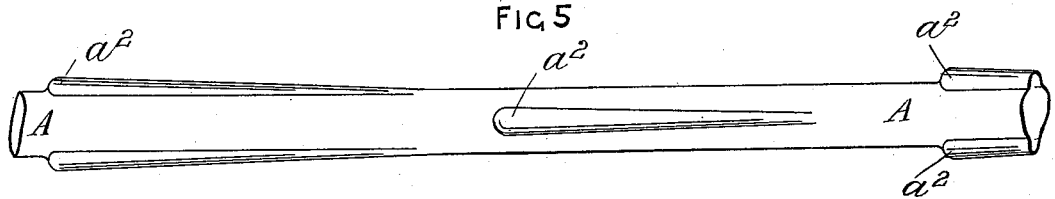
WITNESSES
Herbert Whitehouse
George Herbert Bloye
INVENTOR
Charles Willmott (No Model.) 5 Sheets—Sheet 3.
C. WILLMOTT.
TOOL OR APPARATUS FOR ORNAMENTING METALLIC TUBES.
No. 465,957. Patented Dec. 29, 1891.
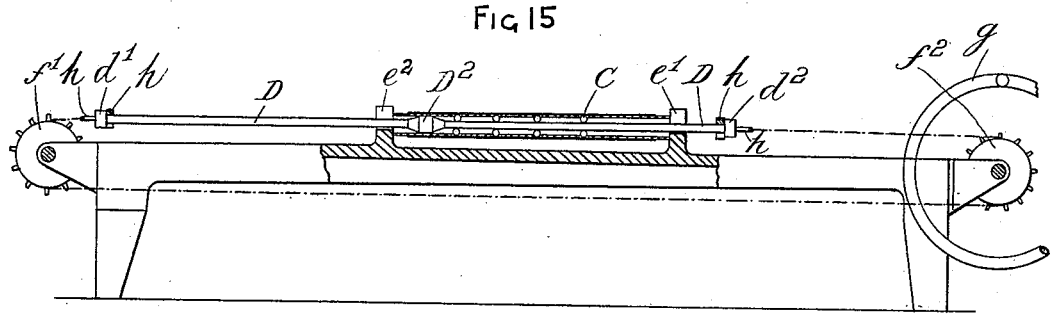
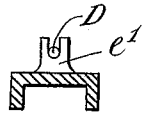
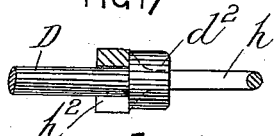
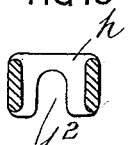
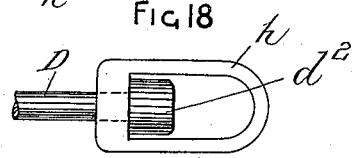
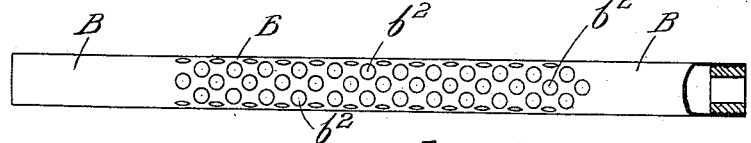
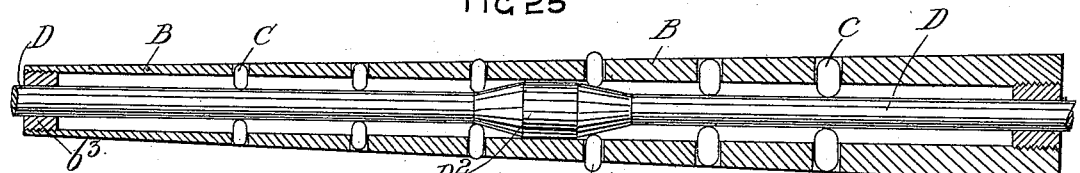
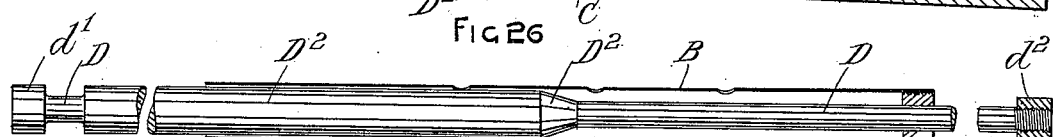
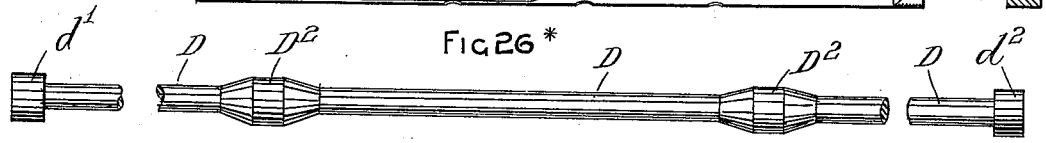
WITNESSES
Herbert Whitehouse.
George Herbert Bloye.
INVENTOR
Charles Willmott (No Model.) 5 Sheets—Sheet 4.

C. WILLMOTT.
TOOL OR APPARATUS FOR ORNAMENTING METALLIC TUBES.

No. 465,957. Patented Dec. 29, 1891.

WITNESSES
Herbert Whitehouse.
George Herbert Bloye

INVENTOR
Charles Willmott (No Model.) 5 Sheets—Sheet 5.
C. WILLMOTT.
TOOL OR APPARATUS FOR ORNAMENTING METALLIC TUBES.
No. 465,957. Patented Dec. 29, 1891.
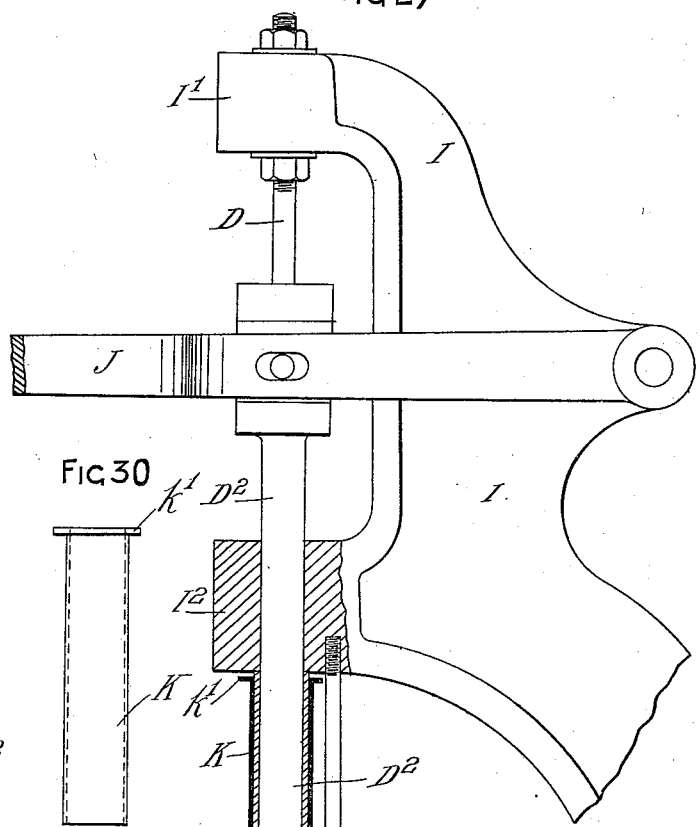
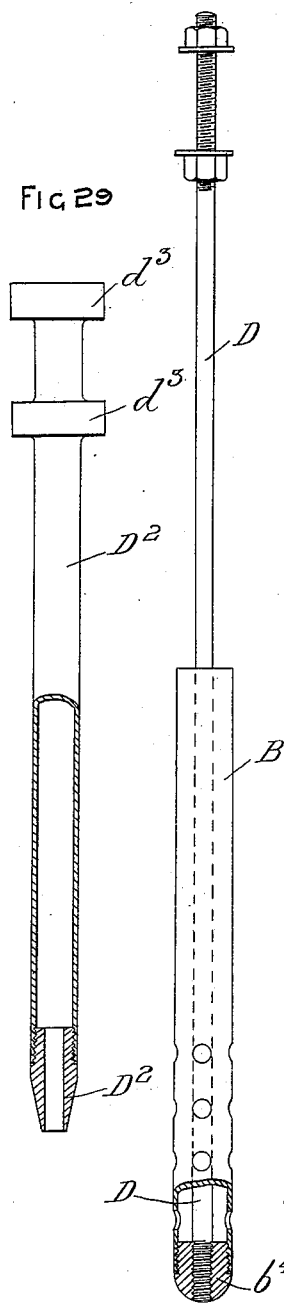
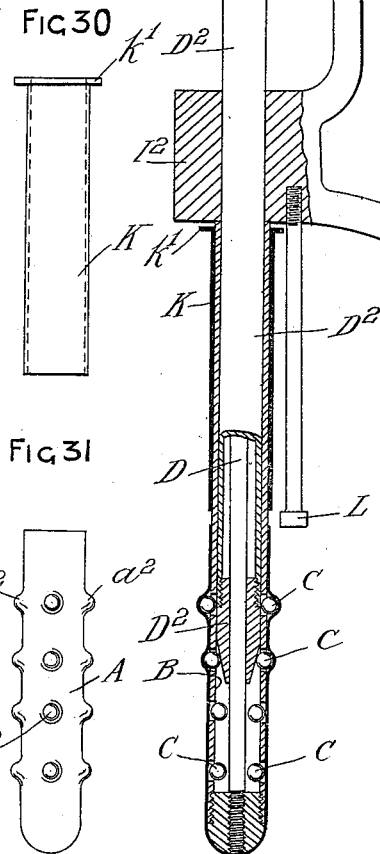
WITNESSES
Herbert Whitehouse
George Herbert Ployé
INVENTOR
Charles Willmott

UNITED STATES PATENT OFFICE.

CHARLES WILLMOTT, OF BIRMINGHAM, ENGLAND, ASSIGNOR OF ONE-FOURTH TO CHARLES BOSWORTH KETLEY, OF SAME PLACE.

TOOL OR APPARATUS FOR ORNAMENTING METALLIC TUBES.

SPECIFICATION forming part of Letters Patent No. 465,957, dated December 29, 1891.

Application filed May 26, 1891. Serial No. 394,165. (No model.)

*To all whom it may concern:*

Be it known that I, CHARLES WILLMOTT, a subject of Her Majesty the Queen of Great Britain and Ireland, residing at Birmingham, in the county of Warwick, England, have invented certain new and useful Improvements in Tools or Apparatus for Ornamenting Metallic Tubes, of which the following is a specification.

The object of this invention is the production of thin brass and other ductile metallic tubes having small knobs or other ornamental parts projecting from their outer surface, so that such tubes may represent, for instance, sticks with projecting knots, or the said projections may be arranged in rows, rings, or otherwise, either to form a design or not, according to taste.

Some tubes ornamented by my invention are illustrated on the accompanying drawings by Figures 1 to 8, both inclusive; but these are only intended as examples, and not as limiting my invention to the particular forms illustrated.

Figure 20:
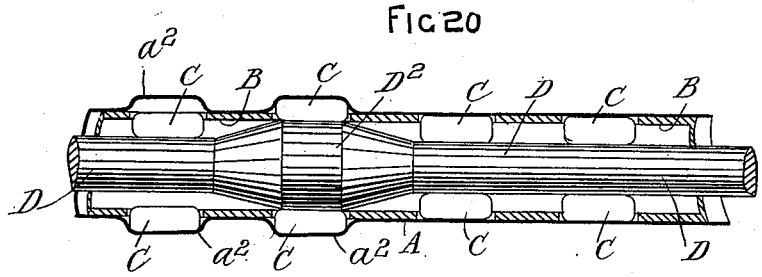
Figure 21:
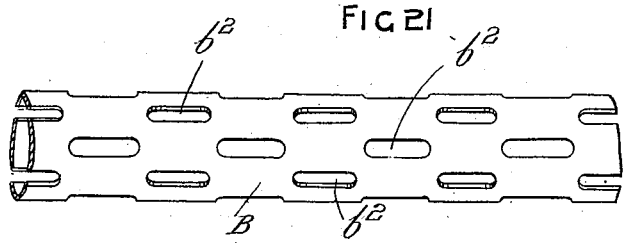
Figure 20:
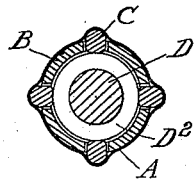
Figure 22:
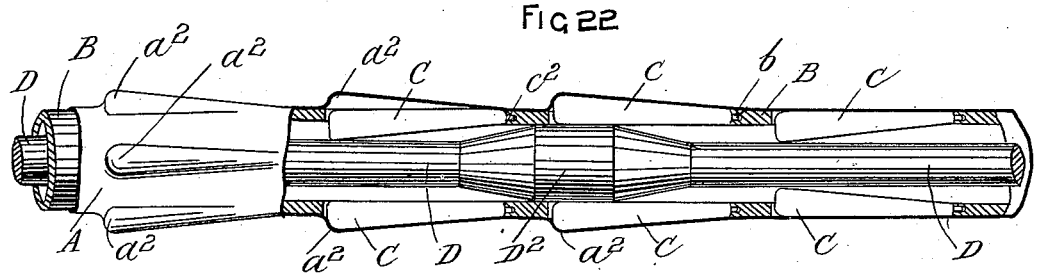
Figure 23:
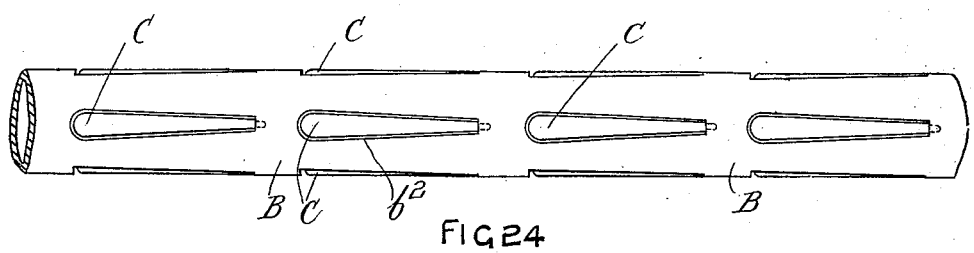
Figure 24:
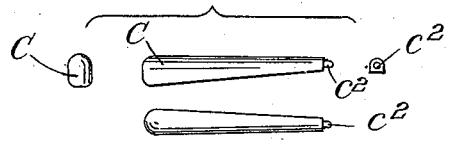

The tube shown by Fig. 1 is round in cross-section and ornamented by small dome-shaped knobs $a^2$, arranged in rows. In the round tube shown by Fig. 2 the said dome-shaped knobs are arranged in spiral form. In Fig. 3 they are arranged in rings round the tube. In the tube shown by Fig. 4 the projections $a^2$ are of an elongated taper form and arranged in rows. In the tube shown by Fig. 5 the projections $a^2$ are somewhat similar to those shown by Fig. 4, but arranged in pairs at opposite sides of the tube. In the tube shown by Fig. 6 the projections $a^2$ are oblong and arranged in rows. The tube shown by Fig. 7 is hexagonal and has dome-shaped projections arranged in rows along the angles, and Fig. 8 is a round taper tube ornamented by dome-shaped projections arranged in rows. I produce the projections $a^2$ on the said tube by internal pressure applied at those parts where the knobs or other projections $a^2$ are required, and I employ tools or appliances for this purpose, which I will describe by referring to the remaining figures of the drawings, of which Fig. 9 represents a piece of ordinary plain parallel round brass or other thin ductile metallic tube before being ornamented. Fig. 10 represents on an enlarged scale, in longitudinal section, the said tube partly ornamented and the tools for ornamenting it. Fig. 11 represents in longitudinal section and in end elevation a part of one of the said tools—to wit, the draw-bar—separately. Fig. 12 shows on a reduced scale the tubular mandrel, and Fig. 12* is a modification of the same. Fig. 13 represents the draw-bar, and Fig. 14 one of the pressure-pieces, all being parts of the said tools, as hereinafter described. Fig. 15 represents in part sectional elevation, and Fig. 16 in cross-section, the said tools and a machine suitable for operating them. Fig. 17 is a part sectional elevation. Fig. 18 is a plan, and Fig. 19 a cross-section, of a part of the said machine. Fig. 20 shows in longitudinal section, Fig. 20* in cross-section, and Fig. 21 in plan, tools formed according to my invention for ornamenting tubes like that shown by Fig. 6 by oblong projections. Figs. 22, 23, and 24 illustrate tools for ornamenting tubes by elongated taper projections $a^2$, similar to those illustrated by Figs. 4 and 5. Fig. 25 represents in longitudinal section tools for ornamenting taper tubes similar to that shown by Fig. 8. Fig. 26 illustrates a modification of my invention; and Figs. 27, 28, 29, 30, and 31 illustrate my invention as applied to ornamenting tubes which are closed at one end—such, for instance, as are used for knife-handles or for parts of pencil-cases.

I will first describe my invention as applied to the ornamentation of thin ductile metallic parallel tubes, such as those shown by Figs. 1, 3, 4, 5, 6, and 7, and refer more particularly to these figures and to Figs. 9 to 24, both inclusive, in which the same letters indicate the same or corresponding parts.

I provide a tubular mandrel B of a size to fit easily inside the thin tube A, to be ornamented, and by preference rather longer than the said tube, so as to facilitate the removal of the finished tube from the mandrel and the placing of a fresh tube thereon, as hereinafter described. This mandrel B can very conveniently be made of a piece of thin cold drawn steel tube. The mandrel B is pierced with holes $b^2$, corresponding with the places where the projections $a^2$ are required on the tube, and fitting easily in each of these holes $b^2$ is a steel or other hard pressure-piece C, which may be spherical or of other form corresponding with the shape of the required projections $a^2$ on the tube A.

In Figs. 10, 12, 14, and 15 the pressure-pieces C are represented as spherical, in Fig. 20 as oblong, and in Figs. 22, 23, and 24 as tapering. Within the mandrel B and projecting through its ends is a draw-bar D, which is about twice as long as the mandrel. This draw-bar D is so much smaller in diameter than the inside of the mandrel B that the spherical or other pressure-pieces C when resting on the draw-bar do not project or only very slightly project beyond the outer surface of the mandrel B.

On the draw-bar D, and by preference in the center thereof, is a swell $D^2$ of about the same size and shape as the inside of the mandrel, so as to fit easily therein, and tapering down at each end to the draw-bar D, so that as the draw-bar is moved along the mandrel the spherical or other pressure-pieces C will successively be forced outwardly beyond the outer surface of the mandrel, and then fall back again within the mandrel when the swell has passed. As the swell $D^2$ has to be made of steel and hardened, I prefer to make it separate from the draw-bar D and to screw it at each end to the draw-bar, as shown by Fig. 11, or the swell can be made in a piece with the draw-bar.

On each end of the draw-bar is a collar (marked, respectively, $d'$ $d^2$) small enough to pass through the tube A, and by preference made loose from the draw-bar D and fixed thereto by screwing. These collars are to facilitate gripping the draw-bar to move it to and fro, as hereinafter described. The ends of the mandrel B are or may be reduced, as shown in Fig. 12, by an internal ring $b^3$, soldered or otherwise fixed therein, so as to prevent the swell coming out of the mandrel.

The tools or appliances above described are used as follows: One end of the draw-bar D and mandrel B is inserted in the tube A, and the latter is moved along the mandrel, the pressure-pieces C being placed in the holes $b^2$ before the holes are covered by the tube A. The pressure-pieces C are thus retained in the holes $b^2$ by resting against the draw-bar D or the tube A. The draw-bar D is then pulled along the mandrel B, which can very readily be done on an ordinary tube-drawing bench by connecting the end of the draw-bar D to the draw-chain, the mandrel meanwhile being held against a stop such as that marked $e'$ in the draw-bench. (Shown by Figs. 15 and 16.) As the swell $D^2$ passes the spherical or other pressure-pieces C it forces them in succession against the inside of the tube A (see Figs. 16, 20, and 22) and bulges those parts outwardly to form the projections $a^2$ required. As the swell $D^2$ passes the pressure-pieces C they recede or are free to recede into the mandrel B, and when all the pressure-pieces C have thus been passed by the swell $D^2$ the tube A is free to be withdrawn from the mandrel B. In order to prevent the pressure-pieces C falling out of the holes $b^2$ as the ornamented tube is being removed from the mandrel, I push the ornamented tube off by pushing a fresh tube onto the mandrel, so that the holes $b^2$ are not exposed to view. The draw-bar D is preferably made twice as long as the mandrel B and the swell $D^2$ made taper at both ends, so that it can be moved along the mandrel in either direction and operate on a fresh tube between each travel, and thus work more quickly than if the draw-bar were made to work in one direction only; but it will be evident that the draw-bar may be made to work in one direction only, if required. When the draw-bar is made to work in one direction, only it is only necessary to make the swell $D^2$ taper at one end, as shown by Fig. 26. In this case the swell $D^2$ is made long enough to project through the mandrel B. When the draw-bar is arranged to work in both directions, both of its ends have to be connected to the draw-chain or draw-chains, which can be led around gear-wheels $f'$ $f^2$ at each end of the draw-bench. (See Fig. 15.) I do not make any claim in respect of this draw-bench. I merely describe it as a good one for operating the draw-bar D. On the same shaft as one of the wheels $f^2$ is a hand-wheel $g$ or other means for turning the shaft to and fro and imparting the necessary backward and forward motion to the draw-bar. In order to quickly disconnect the draw-chain from the ends of the draw-bar each end of the chain may have a coupling-link $h$, as shown by Figs. 17, 18, and 19, which is slotted at $h^2$ to drop onto the draw-bar, and engage with its collars $d'$ $d^2$. The stops $e'$ $e^2$ on the draw-bench are slotted vertically, as shown in Fig. 16, so that the draw-bar can be dropped therein or lifted therefrom, these slots being smaller than the mandrel B. If other knobs or projections $a^2$ are required on the tube A between those thus formed, the tube A need only be turned round on the mandrel through a short space or moved endwise thereon or turned round and moved endwise through a short space, so as to bring other parts of the tube over the holes $b^2$ for the pressure-pieces C to act upon.

When, as in the example illustrated by Figs. 22, 23, and 24, the pressure-pieces C are taper, the smaller end of each of the pressure-pieces C is connected to the mandrel B to prevent that end falling down into the mandrel and becoming wedged by the bulge $d^2$. This can very conveniently be done, as shown by Figs. 22, 23, and 24 by forming a short projecting pipe $C^2$ on the smaller end of each of the pressure-pieces C, which fit loosely in corresponding holes drilled in the mandrel B. In putting these pressure-pieces in the holes $b^2$ this pipe is first inserted in the hole $b^4$.

It will be seen that the pressure-pieces C may be of many forms other than those shown according to the shape of the projections required upon the tube and that my invention is applicable for tubes of any shape in cross-section, whether such tubes are round, oval, triangular, square, or other shape, the mandrel B and the draw-bar D, with its swell $D^2$, being made to correspond. The mandrel may (see Fig. 12) be perforated by as many holes as possible a short distance apart and the balls or other pressure-pieces C only inserted in those holes where projections are required on the tube. One mandrel, such as shown by Fig. 12, will then serve for ornamenting tubes in different patterns.

My invention can be similarly applied to ornamenting thin taper tubes, the tubular mandrel B being made taper outside (see Fig. 25) to suit the tube to be ornamented, but by preference parallel inside. It will be seen that the pressure-pieces C have in this case to be made gradually longer or thicker toward the larger end of the mandrel.

When the knobs or projections on the tube A are arranged in rings, as shown in Fig. 3, or are otherwise arranged, so that there are intervals of unornamented tube as long as the swell $D^2$, the draw-bar D may be made with two or more swells (such as those marked $D^2 D^3$ in Fig. 26*) at intervals apart corresponding with the spaces of unornamented tube, so as to operate on the pressure-pieces C at different parts of the tube at the same time.

I have described the perforated mandrel B and the tube thereon as stationary and the pressure-pieces C as being forced out in succession by the swell $D^2$, or swells moving along inside the mandrel B, as this is what I have found to answer best in practice; but it will be evident that without departing from the nature of my invention I may obtain the same results by making the draw-bar D and its swell $D^2$ or swells stationary and moving thereon the mandrel E and the tube A carried thereby.

My invention can (see Figs. 27, 28, 29, 30, and 31) be similarly applied to ornamenting tubes which are open at one end only—such, for instance, as tubes for knife-handles or parts of pencil-cases. A tube A of this kind ornamented by tools arranged, as shown by Fig. 27, is illustrated by Fig. 31. The lower dome-shaped end of this tube is closed and the other end is open. The draw-bar D projects only at one end of the mandrel B, and the other end $b^4$ of the mandrel B is fixed to the draw-bar D. In this case the draw-bar D is stationary, and the swell $D^2$ is made to slide thereon and produced beyond the open end of the mandrel B and furnished with collars $d^3$ or otherwise formed, so that it can be gripped and moved to and fro.

The mandrel B, draw-bar D, and swell $D^2$ can very conveniently be arranged in a hand-press I, as shown by Fig. 27. The fixed draw-bar D is carried by the lug I' of the press, and the sliding swell $D^2$ is moved to and fro thereon and in the bearing $I^2$ by the hand-lever J, centered at $j'$. A tube, such as K, fitting easily on the mandrel B, is used to slide down after the tube A as the latter is being drawn off the mandrel to prevent the balls or other pressure-pieces C falling out. This tube may have a flange $k'$, which, when the tube has covered all the holes in the mandrel, comes into contact with the stop L, and is thus prevented from moving down too far. When the tube A is placed on the mandrel, as shown in Fig. 27, the hand-lever J has to be pulled down to move the swell $D^2$ along the mandrel B and force out the pressure-pieces C in succession, as in the other arrangements hereinbefore described. On the hand-lever and swell $D^2$ being raised the pressure-pieces C successively recede or are free to recede and lie against the draw-bar D, and the ornamented tube A can be pushed off the mandrel by sliding down the tube K to close the hole in the mandrel.

What I claim as my invention, and desire to secure by Letters Patent, is—

1. In combination with the tubular mandrel having perforations therein, the pressure-pieces, and means for forcing the pressure-pieces outward against the walls of the tube to be ornamented, substantially as described.

2. In combination with the tubular mandrel having perforations therein, pressure-pieces adapted to fit in said perforations, and a rod having inclined swells or enlargements for forcing the pressure-pieces outward, substantially as described.

3. In combination, the tubular mandrel having a series of slots, elongated pressure-pieces pivoted at one end in said slots, and means for forcing the free ends outward, substantially as described.

4. The described method of ornamenting metallic tubes, consisting in forcing suitable pressure-pieces through perforations in a mandrel against the inside walls of the tube to form projections upon the outside thereof, substantially as described.

In testimony whereof I have signed in the presence of two subscribing witnesses.

CHARLES WILLMOTT.

Witnesses:
HERBERT WHITEHOUSE,
GEORGE HERBERT BLOYE.